United States Patent [19]
Merz

[11] 3,851,926
[45] Dec. 3, 1974

[54] PIPE ARTICULATION

[75] Inventor: Walter Merz, Kuesnachi, Switzerland

[73] Assignee: Swiss Aluminium, Ltd., Neuhausen am Rheinfall, Germany

[22] Filed: Apr. 13, 1973

[21] Appl. No.: 351,088

[30] Foreign Application Priority Data
Apr. 14, 1972   Switzerland.................... 5583/72

[52] U.S. Cl.................................. 302/29, 302/64
[51] Int. Cl............................................. B65g 53/52
[58] Field of Search ............ 259/3, 72, 75, DIG. 17; 302/29, 31, 64

[56] References Cited
UNITED STATES PATENTS

| | | | |
|---|---|---|---|
| 766,097 | 7/1904 | Bierley............................ | 259/75 X |
| 2,498,405 | 2/1950 | Fader............................... | 259/75 X |
| 2,530,403 | 11/1950 | Seaman............................ | 259/3 X |
| 2,708,602 | 5/1955 | Galle................................ | 302/29 |
| 2,722,840 | 11/1955 | Kececioglu ...................... | 259/72 X |
| 2,785,886 | 3/1957 | Muller.............................. | 302/29 X |
| 2,804,349 | 8/1957 | Pynor................................ | 302/29 |
| 2,832,645 | 4/1958 | Barrett.............................. | 302/29 |
| 2,984,461 | 5/1961 | Butler et al...................... | 259/72 X |
| 2,997,150 | 8/1961 | Emanuelson..................... | 193/16 X |

FOREIGN PATENTS OR APPLICATIONS

| | | | |
|---|---|---|---|
| 277,032 | 10/1964 | Netherlands...................... | 302/29 |
| 1,150,302 | 6/1963 | Germany ........................... | 302/29 |
| 729,178 | 11/1942 | Germany ........................... | 302/29 |
| 1,218,941 | 6/1966 | Germany ........................... | 302/29 |

*Primary Examiner*—Evon C. Blunk
*Assistant Examiner*—W. Scott Carson
*Attorney, Agent, or Firm*—Ernest F. Marmorek

[57] ABSTRACT

A pipe articulation, for use in a conveyor for particulate solid materials, comprising an inlet duct, an outlet, and first and second housing parts defining a chamber, the housing parts being arranged to rotate relatively to each other about a substantially horizontal axis, the inlet duct intersecting the first housing part and the outlet being in the second housing part, the inlet duct having a first fluidising floor, and the first housing part having a second fluidising floor.

9 Claims, 3 Drawing Figures

PIPE ARTICULATION

Pipe articulations are known which are arranged in a pneumatic conveyor device for emptying of storage chambers, between a part which can swing, belonging to a pick-up, and a further part of the suction pipes. It has however appeared disadvantageous with such pipe articulations, often having a diameter of more than 1000 mm, that these are exposed to a relatively great wear, which is dictated substantially by the construction of the articulation, or by the shape of the chamber within it, and acts particularly disadvantageously during the conveyance of strongly abrasive materials, as for example alumina.

When such pipe articulations are inserted between two suction pipes of a penumatic conveyor device, it is desired that eddying of the material with the conveying air should be avoided, so as on the one hand to counteract excessive wear of the articulation, and on the other hand to lighten the operation of a separator usually arranged at a small distance from the articulation.

According to the present invention a pipe articulation, for use in a conveyor for particulate solid material, comprises an inlet duct, an outlet, and first and second housing parts defining a chamber, the housing parts being arranged to rotate relatively to each other about a substantially horizontal axis, the inlet duct intersecting the first housing part, and the outlet being in the second housing part, the inlet duct having a first fluidising floor, and the first housing part having a second fluidising floor extending to the outlet form beneath the intersection of the inlet duct with the first housing part.

The accompanying drawings show one example of an articulation embodying the present invention, In these drawings.

Figure 1:
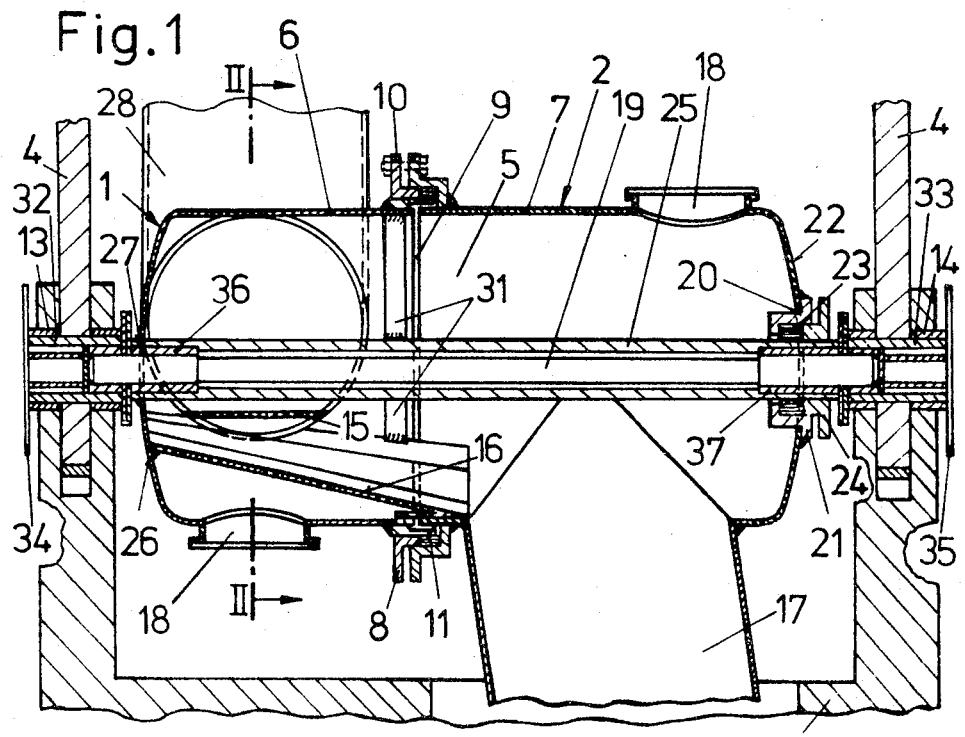
FIG. 1 is a longitudinal section through the articulation.

The pipe articulation has a chamber 5 defined by a first housing part 1 and by a second housing part 2. As described more fully below, the two housing parts are able to rotate relatively to each other about the axis of a horizontal shaft 19. In fact in this arrangement the second part 2 remains stationary in use, relatively to the shaft 19, with the first part 1 swings about the shaft 19. This first part if joined to an inlet duct in the form of a short downstream portion 28a of a conveyor pipe 28. This pipe 28 is supported by an arm 4 which is also mounted to swing about the shaft 19. Between two adjacent cylindrical walls 6 and 7 of the housings parts 1 and 2 respectively, there is an annular gap 9, covered and sealed by a sliding ring seal 8. The sliding ring seal 8 is provided with an adjusting ring 10, through which a possibility of subsequent adjustment exists, to take account of wear of a sealing ring 11.

The arm 4 with the conveyor pipe 28 and housing part 1 on the one hand, and the housing part 2 on the other hand, are journalled to swing relatively to one another between two supporting bearings 13 and 14 arranged in a frame 12. In the conveyor pipe 28, including the inlet duct 28a, there is a first pneumatically-operated fludising floor 30, 30a.

In the half chamber defined by the first housing part 1, beneath the zone of connection 15 of the latter with the inlet duct 28a, there is arranged a second pneumatically-operated fluidising floor 16, which extends past the seal 8 of the annular gap 9 between the walls 6, 7 of the parts 1 and 2, with a slight downward inclination, as far as downwardly extending pipe portion 17 branching off from the cylindrical wall 7 of the second housing part 2. The entrance to this pipr portion 17 constitutes the oulet of the articulation. The pipe portion 17 is connected to the frame 22, or supported on the latter in a manner not shown through an annular rubber buffer arranged in a horizontal plane.

Figure 2:
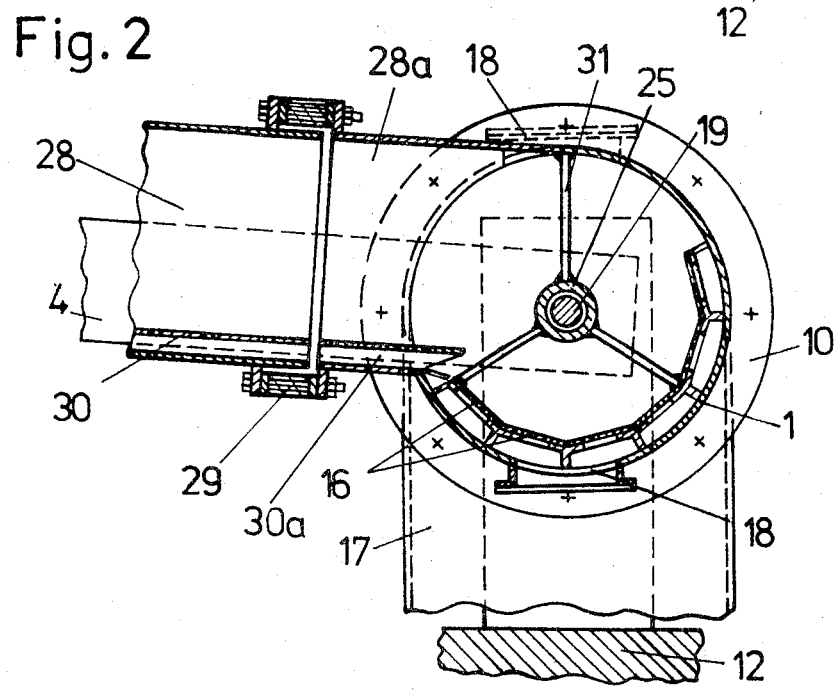
FIG. 2 is a section through the articulation on the line II—II in FIG. 1.
Figure 3:
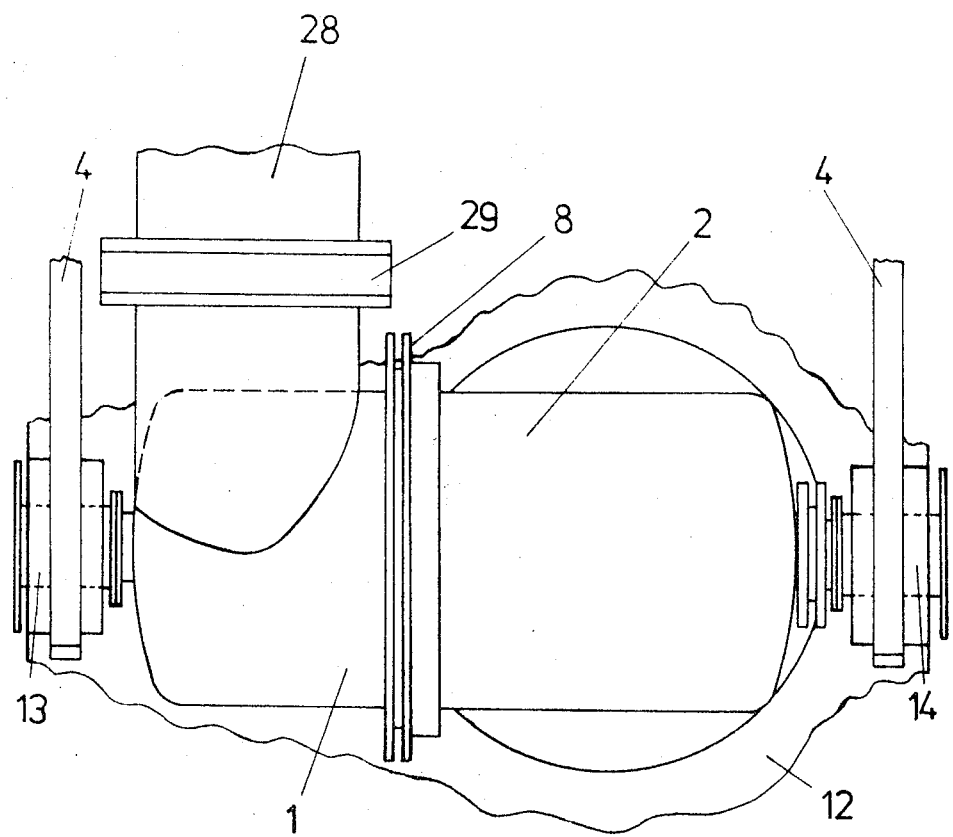
FIG. 3 is a plan of the articulation.

The fluidising floor 16 is assembled from individual elements, as shown in FIG. 2, and is concave upwards in sections perpendicular to the shaft 19. The fluidising floor 16 is made in a known manner of a porous material, i.e. a sintered metal or a fabric of polyester. The parts 1 and 2 have each at least one closeable opening 18, through which access to the fluidising floor 16 is possible. Air is supplied to the fluidising floor by means of a pipe line not shown, which leads to the floor from a source of pneumatic pressure.

The end walls 26 and 22 of the housing parts 1 and 2 each have a central hole 27, 20, through which is inserted a shaft 19 briding the pair of supporting bearings 13, 14. Over the shaft 19 there is fitted a pipe 25 of wear-resisting material which, like the shaft 19, is inserted through the two holes 27 and 20. The pipe 25 is fixed to the end wall 26 of the housing part 1, by welding, so that during swinging of the arm 4 and of the part 1 the pipe rotates as well. The pipe 25 is sealed relatively to the end wall 22 of the stationary housing part 2, by a sleeve 21 provided with interchangeable sealing rings 23. These sealing rings are held by an adjusting ring 24 which can by screwed relatively to the sleeve 21.

As shown in FIG. 2 the inlet duct 28a is connected with the conveyor pipe 28 through an intermediate annular member 29 which is rubber like and shock absorbing. By the arrangement of this intermediate member 29, loadings on the supporting bearings 13, 14 of the articulation that may arise are reduced to a minimum value.

The frame 12 is mounted, by means (not shown) which is not related to the present invention, so as to be rotatable in a horizontal plane, and the second housing part 2 and the shaft 19 take part in this movement.

In use, particulate solid material, conveyed through the conveyor pipe 28 by stream of air over the fluidising floor 30, passes through the inlet duct 28a over the fluidising floor 30a, falls in the neighbourhood of the connecting zone 15 onto the second fluidising floor 16 arranged in the chamber 5, and is conveyed over the latter as far as the pipe 17 branching off from the cylindrical wall 7 if the second housing part 2, through which the material arrives into a receiver (not shown), or is conveyed to a loading station.

Through the arrangement of the fluidising floor 16 in the chamber 5 of the articulation, it has now become possible to convey the material, which has been conveyed substantially in a layer on the fluidising floor 30 of the conveyor pipe 28, in the direction towards the outlet of the articulation, at a relatively low velocity without acceleration or deceleration, in a uniform flow pattern through the chamber 5, with simultaneous avoidance of eddying. From this there results a relatively slight wear of the significant components of the articulation, and the material arrives in the pipe 17 branching off from the chamber 5 substantially in a layer separated from the conveying air stream, so that, when required, an economical separation of dust can also be undertaken in the near neighbourhood of the pipe articulation, if this is desired. The fluidising floor 16 has a relatively slight inclination relatively to the axis of the pipe 19, and thus requires little space in the chamber 5. The pipe 17, branching off from the chamber 5, is inclined in the direction of the flow of the material, for the avoidance of eddying.

With reference to the flow pattern of the material in the chamber 5, it is especially desired that during the conveying operation a stream of air forms above the material, so that the material moves immediately above the fluidising floor 16 in a constant layer and arrives in this state in the pipe 17. The pipe 17 is arranged offset upsteam relatively to the end wall 22 of the housing part 2, and a body of air stagnates adjacent to the end wall 22.

In the near neighbourhood of the gap 9 there are stiffening ribs 31, fixedly connected on the one hand with the wall 6 of the first housing part 1, and on the other hand with the pipe 25, which support the part 1 centrally relatively to the pipe 25. The wall 7 of the second housing part 2 is supported by the sliding ring seal 8 on the circumference of the part 1, so that both housing parts 1, 2 are carried by the pipe 25 and form a unitary assembly with the latter.

The pipe 25 is journalled to turn relatively to the shaft 19 on bearing sleeves 36, 37 arranged at both ends of the latter. The shaft 19 is slidingly journalled in bearing bushes 32, 33 of the supporting bearings 13, 14 arranged on the frame 12. On the outer circumference of the bearing bushes 32, 33 there is journalled in each case an arm 4 serving to support the conveying pipe 28, and able to swing coaxially to the shaft 19. In the sleeves 32, 33 there are inserted spigots (not shown) on cover plates 34, 35, held by clamping connections (also not shown).

The assembly and installation of the pipe articualtion between the two supporting bearings 13, 14 of the frame 12 is easily carried out as follows. The shaft 19 is pushed from one side into the bearing bushes of the supporting bearings 13, 14 and into the pipe 25. In addition the cover plates 34, 35 have simply to be inserted in the bearing bushes 32, 33 of both supporting bearings 13, 14.

With the help of the invention, it has now become possible to manufacture long-lived pipe articulations with a relatively slight expenditure, which is especially suitable for installation in pneumatic conveying devices for emptying of storage chambers.

What we claim is:

1. A pipe articulation, for use in changing the direction of flow of particulate solid materials in a conveyor for particulate solid materials, comprising an inlet duct, an outlet, and first and second housing parts defining a chamber, the housing parts being arranged to rotate relatively to each other about a substantially horizontal axis, the inlet duct intersecting the first housing part, whereby the particulate material is conveyed at relatively low velocity into said first housing part and the outlet being in the second housing part, said inlet duct and said outlet duct being at an angle relative to said horizontal axis whereby the particulate material is conveyed out of said pipe articulation through said outlet, in a direction different than the direction in which it was conveyed into said inlet duct, said inlet direction depending on the relative rotation of said housing parts, the inlet duct having a first fluidising floor, and the first housing part having a second fluidising floor, whereby the particulate matter may be maintained in a fluidised condition to facilitate conveyance through said pipe articulation.

2. A pipe articulation according to claim 1, in which the second fluidising floor extends into the second housing part.

3. A pipe articulation according to claim 1, in which the second fluidising floor extending to the outlet from beneath the intersection of the inlet duct with the first housing part.

4. A pipe articulation according to claim 1, in which the second fluidising floor, in section perpendicular to the axis of relative rotation, is concave upwards.

5. A pipe articulation according to claim 1, in which the second fluidising floor is assembled from several individual elements.

6. A pipe articulation according to claim 1, in which the two housing parts are journalled to be able to swing on a shaft extending between bearings at each end of the chamber.

7. A pipe articulation according to claim 6, including a pipe of wear-resistant material covering the shaft within the chamber.

8. A pipe articulation according to claim 7, in which the pipe is fixed by supporting ribs to a wall of the chamber.

9. A pipe articulation according to claim 1, in which the chamber has at least one closeable opening, through which access to the second fluidising floor is possible.

* * * * *